March 29, 1960  G. A. LYON  2,930,655
WHEEL COVER
Filed Dec. 13, 1956
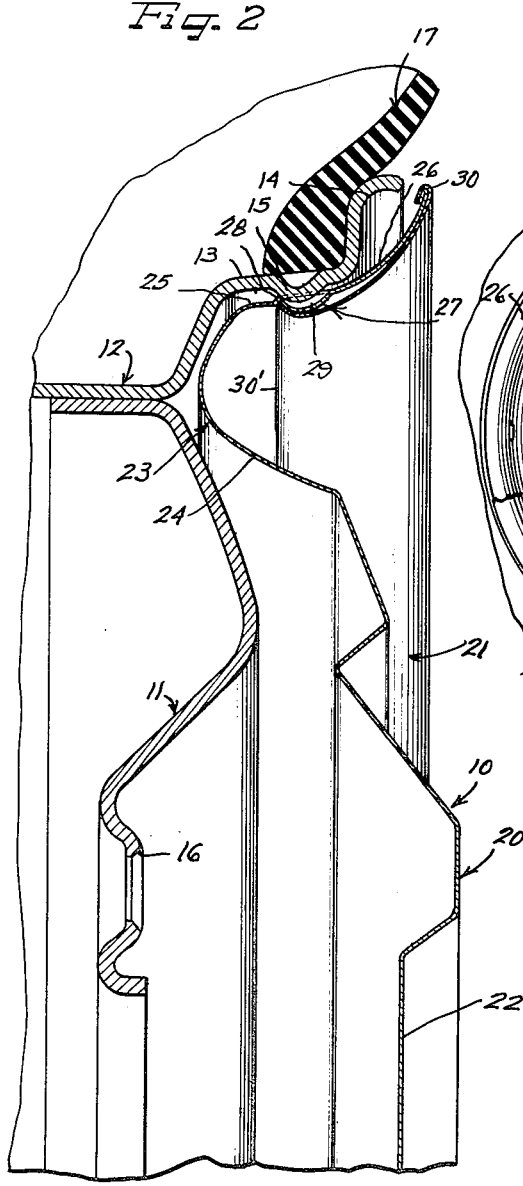
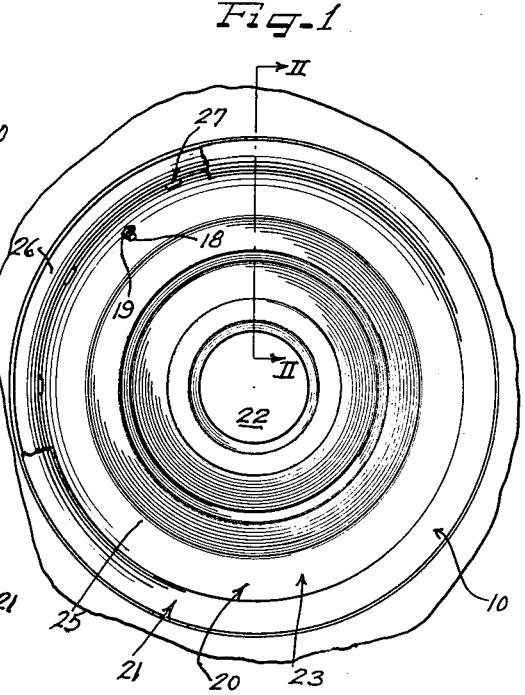
Inventor
GEORGE ALBERT LYON

United States Patent Office 2,930,655
Patented Mar. 29, 1960

2,930,655

WHEEL COVER

George Albert Lyon, Detroit, Mich.

Application December 13, 1956, Serial No. 628,142

10 Claims. (Cl. 301—37)

This invention relates generally to wheel structures and more particularly to an ornamental wheel cover section for protective retained disposition upon the outer side of a vehicle wheel.

The present invention concerns a new wheel cover construction and its manner of cooperation with a vehicle wheel. To this end, means have been provided to augment the resiliency of the retaining means provided on the cover and for concealing the same.

Accordingly, an object of this invention is to provide a new and improved retaining action between a wheel cover section and a vehicle wheel.

Still another object of this invention is to provide ornamental means for concealing the retaining means on a vehicle wheel.

A further object of this invention is to provide a wheel cover member which is adapted to detachably cooperate with a vehicle wheel in interlocked assembly therewith.

Yet another object of this invention is to provide a highly ornamental wheel cover member which is adapted to efficiently cooperate in detachable assembly with a vehicle wheel and which may be manufactured on a large scale at a low cost.

According to the general features of this invention, there is provided in a wheel structure, a wheel having rim and body parts and circumferentially spaced bumps on an axial portion of the wheel, a wheel cover assembly for overlying disposition upon the wheel including a cover having a dished cover portion defined by annular axial wall portions one of which has circumferentially spaced notched portions, said portions having resiliently deflectable edges disposed at the axially inner side thereof which notch edges are arranged in a common circle and deflectable together upon being pressed over said bumps and a circular cover section overlying a portion of said cover and provided with an annular edge snugly engaged over and behind said notched portions in retained assembly with said cover augmenting the resilient deflectability of said edges.

Other objects and features of the present invention will more fully become apparent in view of the following detailed description taken in conjunction with the accompanying drawings illustrating a single embodiment and in which:

Figure 1 is a side elevation of my wheel structure; and

Figure 2 is an enlarged fragmentary cross-sectional view taken substantially on the line II—II of Figure 1 looking in the direction indicated by the arrow.

A wheel cover assembly 10 according to the present invention is constructed and arranged to be applied in press-on, pry-off relation to the outer side of a vehicle wheel which may be of a conventional type having a disk spider wheel body 11 carrying a multi-flange, drop center tire rim 12 having an axially outwardly inclined rim flange 13 merging with and terminating in a curled terminal rim flange 14. Provided on the intermediate rim flange 13 at circumferentially spaced intervals are pressed out bumps 15. It will be appreciated, the wheel body 11 may be fastened to the axle of an automobile and the like in any suitable manner such as by means of inserting lugs through openings 16 in the wheel body and thereafter threading nuts onto the lugs to clamp the body to the axle in a conventional manner.

The tire rim 12 is adapted to support a pneumatic tire and tube assembly, or a tubeless tire 17 as is shown. The tire 17 may be inflated by injecting air into the valve stem 18 (Fig. 1) which extends through cover opening 19.

The wheel cover assembly 10 includes inner and outer cover members 20 and 21. The inner cover member 20 comprises a one-piece sheet metal stamped and drawn circular body having a central crown portion 22 for overlying the central portion of the wheel body 11 and merging with an intermediate annular inwardly dished portion 23 defined by axially inner and axially outer annular side wall portions 24 and 25, and with the axially outer side wall portion 25 extending radially and axially outwardly merging with an outer annular marginal portion 26 for overlying the tire rim 12.

Provided on the axially outer side wall portion 25 at circumferentially spaced intervals are radially inwardly pressed out bulges or radially offset or notched portions 27 each of which is adapted to telescopingly cooperate in detachable assembly with a corresponding bump 15 on the tire rim 12.

Each of the bulges is pressed out radially away from the annular side wall 25 to define a radially outwardly opening notch.

Lying in a common circle at the junction of the side wall portion 25 with the outer marginal portion 26 is an edge area which is defined by curved edges 28 which edges constitute the axially inner periphery of the notched portions 27. At the junction of the cover portions 25 and 26 in Figure 2, the cover portion 26 is slightly radially offset with respect thereto and an annular radially and axially inclined reinforcing shoulder area links the portions with the radially outer edge area of the annular radially and axially inclined shoulder area being disposed in a circular orbit common to the edges 28. The edges 28 are resiliently deflectable and will be flexed radially inwardly when they are biased against the bumps 15.

Each of the notched out portions 27 is provided with circumferentially spaced axially extending side walls 29 which are adapted to abut against the sides of the bumps to insure corotation of the cover with respect to the wheel.

The outer cover or ring member 21 has a continuous annular deflectable inner edge 30' which has been deflected over the pressed out portions 27 until the edge is lodged within the radially inwardly opening recess defined at the junction of cover portions 25 and 26 behind the pressed out portions 27.

Generally radially and axially outwardly of the bulges 27 the cover members 20 and 21 are concentrically formed and disposed in superimposed abutting relation to one another with their radially and axially outermost edges turned under at 30 and abutted against the annular radially and axially outwardly inclined shoulder at the junction of the cover portions 25 and 26 to interlock the cover members 20 and 21 into assembly. It is in this manner the outer margin 26 is stiffened to augment the resilient deflectability of the assembly 10.

By virtue of the present relationship between the cover members 20 and 21 the resilient deflectability of the edges 28 are augmented, and in addition, the radially inner margin of the ring 21 serves to conceal the protuberances 27.

The cover assembly 10 may be assembled upon the wheel after the cover members 20 and 21 have been placed in interlocked assembly in the manner above set forth. To this end, the valve stem 18 is initially aligned with respect to the cover opening 19 and it is in this manner that the protuberances 27 are centered with respect to the bumps 15. Upon the application of an axially inward force, certain of the edges 28 are biased against the axially outer surface of the bumps 15 until the bumps 15 become lodged in the pocket defined by the protuberances and with the edges 28 engaged on the axially inner side of the bumps 15.

Generally, only four bumps 15 are required and there may be a larger number of bulges 27 as is desired.

The cover assembly may be removed from the wheel by inserting a suitable pry-off tool underneath the outer margin of the cover assembly and upon the application of a suitable twisting levering pry-off force, the cover assembly may be ejected from the wheel.

It will be understood that modifications and variations may be effected without departing from the scope of the novel concepts of the present invention.

I claim as my invention:

1. In a wheel structure, a wheel having rim and body parts and circumferentially spaced bumps on an axial portion of the wheel, a wheel cover assembly for overlying disposition upon the wheel including a cover having a dished cover portion defined by annular axial wall portions one of which has circumferentially spaced notched portions, said notched portions having resiliently deflectable edges disposed at the axially inner side thereof which edges are arranged in a common circle and deflectable together upon being pressed over said bumps thereby bottoming the notched portions axially behind and against the bumps, and a circular cover section overlying a portion of said cover and provided with an annular edge engaged behind said notched portions in retained assembly with said cover augmenting the resilient characteristic of said edges.

2. In a wheel structure, a wheel having rim and body parts and circumferentially spaced bumps on an axial portion of the wheel, a wheel cover assembly for overlying disposition upon the wheel including a cover having a dished cover portion defined by annular axial wall portions one of which has circumferentially spaced notched portions, said notched portions having resiliently deflectable edges disposed at the axially inner side thereof which edges are arranged in a common circle and deflectable together upon being pressed over said bumps, and a circular cover section overlying a portion of said cover and provided with an annular edge engaged behind said notched portions in retained assembly with said cover augmenting the resilient characteristic of said edges, said notched portions each having axially extending circumferentially spaced side edges for engagement against said bumps to insure corotation and with said cover section overlying and concealing said bumps.

3. In a wheel structure, a wheel having rim and body parts and circumferentially spaced bumps on an axial portion of the wheel, a wheel cover assembly for overlying disposition upon the wheel including a cover having a dished cover portion defined by annular axial wall portions one of which has circumferentially spaced notched portions, said notched portions having resiliently deflectable edges disposed at the axially inner side thereof which edges are arranged in a common circle and deflectable together upon being pressed over said bumps, and a circular cover section overlying a portion of said cover and provided with an annular edge engaged behind said notched portions in retained assembly with said cover augmenting the resilient characteristic of said edges, said cover and said cover section having margins turned under to interlock the same to form said wheel cover assembly.

4. In a wheel structure, a wheel having rim and body parts and circumferentially spaced bumps on an axial portion of the rim, a wheel cover assembly for overlying disposition upon the wheel including a cover having a dished cover portion defined by annular axial wall portions one of which has circumferentially spaced notched portions, said notched portions having resiliently deflectable edges disposed at the axially inner side thereof which edges are arranged in a common circle and deflectable together upon being pressed over said bumps on said rim, and a circular cover section overlying the outer margin of said cover and provided with an annular edge engaged behind said notched portions in retained assembly with said cover augmenting the resilient characteristic of said edges, said resiliently deflectable edges facing radially away from the cover to provide a bump engaging surface.

5. In a wheel structure including a wheel body and a tire rim with cover retaining bumps on a generally radially facing flange of the wheel, a wheel cover assembly for overlying disposition upon the wheel including a cover having a dished cover portion defined by annular axial side walls one of which has a notched bump engaging portion, a resiliently deflectable edge disposed at the axially inner side of said portion which edge is deflectable upon being pressed over said bumps the edge being retainingly engaged behind the bumps, and a circular cover section overlying a portion of said cover and provided with an annular edge engaged over and behind said notched portion in retained assembly with said cover augmenting the resilient characteristic of said edge.

6. In a wheel structure including a wheel body and a tire rim with cover retaining bumps on a generally radially facing flange of the wheel, a wheel cover assembly for overlying disposition upon the wheel including a cover having a dished cover portion defined by annular axial side walls one of which has a notched bump engaging portion, a resiliently deflectable edge disposed at the axially inner side of said portion which edge is deflectable upon being pressed over said bumps, and a ring overlying a portion of said cover and provided with an annular edge engaged over and behind said notched portion in retained assembly with said cover augmenting the resilient characteristic of said edge, said edge facing in an opposite direction with respect to said ring to provide an offset bump engaging surface and with said ring having its annular edge engaged radially behind said resiliently deflectable edge.

7. In a wheel structure, a wheel having rim and body parts and circumferentially spaced bumps on an axial portion of the wheel, a wheel cover assembly for overlying disposition upon the wheel including a cover having a dished cover portion defined by annular axial wall portions one of which has circumferentially spaced notched portions, said notched portions having a resiliently deflectable edge area disposed at the axially inner side thereof which edge area is disposed in a circle and deflectable upon being pressed over said bumps, and a circular cover section overlying a portion of said cover and provided with an inner marginal edge area engaged behind said notched portions in retained assembly with said cover augmenting the resilient characteristic of said edges.

8. In a wheel structure, a wheel having rim and body parts and circumferentially spaced bumps on an axial portion of the rim, a wheel cover assembly for overlying disposition upon the wheel including a cover having a dished cover portion defined by annular axial wall portions one of which has circumferentially spaced notched portions, said notched portions having resiliently deflectable edge area disposed at the axially inner side thereof which edge area is arranged in a common circle and deflectable upon being pressed over said bumps, and a ring overlying a portion of said cover and provided with a radially inner marginal edge area engaged behind said notched portions in retained assembly with said cover, said annular axial wall portion having said notched portions including axially inner and axially outer wall areas with the axially outer wall area being offset with respect to the axially inner wall area and being linked together by an annular reinforcing shoulder, said annular shoulder having an annular edge area disposed in a common circular orbit with said resiliently deflectable edge area provided by said circumferentially spaced notched portions.

9. In a wheel structure, a wheel having rim and body parts and circumferentially spaced bumps on an axial portion of the wheel, a wheel cover assembly for overlying disposition upon the wheel including a cover having a dished cover portion defined by annular axial wall portions one of which has circumferentially spaced, notched portions, said notched portions having resiliently deflectable edge area disposed at the axially inner side thereof which edge area is arranged in a common circle and deflectable upon being pressed over said bumps, and a circular cover section overlying a portion of said cover and provided with an inner marginal edge area engaged behind said notched portions in retained assembly with said cover, said annular axial wall portion having said notched portions including axially inner and axially outer wall areas with the axially outer wall area being offset radially with respect to the axially inner wall area and being linked together by an annular reinforcing shoulder, said annular shoulder having an annular edge area disposed in a common circular orbit with said resiliently deflectable edge area provided by said circumferentially spaced notched portions, said section having its inner margin overlying and concealing said notched portions and abutted again said annular shoulder on the axially inner side thereof.

10. In a wheel structure, a wheel having rim and body parts and circumferentially spaced bumps on an axial portion of the rim, a wheel cover assembly for overlying disposition upon the wheel including a cover having a dished cover portion defined by annular axial wall portions one of which has circumferentially spaced radially offset portions, said radially offset portions having a resiliently deflectable edge area disposed at the axially inner side thereof which edge area is circular and is deflectable radially inwardly upon being pressed over said bumps, the edge area being retainingly engaged behind the bumps on the rim, and a ring overlying an outer margin of said cover and provided with an inner marginal ring edge area retainingly engaged behind said radially offset portions in retained assembly with said cover.

References Cited in the file of this patent

UNITED STATES PATENTS

| | | |
|---|---|---|
| 2,102,470 | Lyon | Dec. 14, 1937 |
| 2,326,788 | Lyon | Aug. 17, 1943 |
| 2,434,940 | Lyon | Jan. 27, 1948 |
| 2,624,640 | Lyon | Jan. 6, 1953 |